United States Patent [19]

Clendening

[11] Patent Number: 5,813,168
[45] Date of Patent: Sep. 29, 1998

[54] ENVIRONMENTALLY CONTROLLED GREENHOUSE

[75] Inventor: Thomas Clendening, Yorktown, Ind.

[73] Assignee: McColliberry Farms, Inc., Yorktown, Ind.

[21] Appl. No.: 313,186

[22] PCT Filed: Apr. 29, 1993

[86] PCT No.: PCT/US93/04010

§ 371 Date: Oct. 7, 1994

§ 102(e) Date: Oct. 7, 1994

[87] PCT Pub. No.: WO93/21755

PCT Pub. Date: Nov. 11, 1993

[51] Int. Cl.$^6$ .................................................. A01G 9/00
[52] U.S. Cl. .................................................. 47/17; 47/62
[58] Field of Search .................................. 47/17, 60, 62, 47/58

[56] References Cited

U.S. PATENT DOCUMENTS

| | | | |
|---|---|---|---|
| 1,526,766 | 2/1925 | Arnold | 47/17 B |
| 1,781,515 | 11/1930 | Lewis . | |
| 1,886,192 | 11/1932 | Jones . | |
| 3,033,541 | 5/1962 | Belkin | 261/112 |
| 3,099,696 | 7/1963 | Meek | 261/24 |
| 3,673,733 | 7/1972 | Allen | 47/60 EC |
| 4,038,347 | 7/1977 | Mickley | 261/30 |
| 4,089,916 | 5/1978 | Hay | 261/153 |
| 4,166,339 | 9/1979 | Heller et al. | 47/17 EC |
| 4,242,833 | 1/1981 | Maes, Jr. | 47/17 |
| 4,249,340 | 2/1981 | Maes, Jr. | 47/17 |
| 4,256,674 | 3/1981 | Shafranovsky et al. | 261/112 |
| 4,414,784 | 11/1983 | Masters | 52/73 |
| 4,434,787 | 3/1984 | Young, III | 126/438 |
| 4,552,212 | 11/1985 | Nuttle | 165/48.2 |
| 4,597,272 | 7/1986 | Marx, II et al. | 62/304 |
| 4,617,755 | 10/1986 | Ikeda et al. | 47/65 D |
| 4,706,420 | 11/1987 | Winkler | 52/66 |
| 4,928,444 | 5/1990 | Horie et al. | 52/66 |
| 5,036,618 | 8/1991 | Mori . | |
| 5,056,259 | 10/1991 | Allen | 47/17 |

FOREIGN PATENT DOCUMENTS

| | | | |
|---|---|---|---|
| 0195220 | 9/1986 | European Pat. Off. | 47/62 |
| 2544842 | 10/1984 | France | 47/17 EC |
| 1021437 | 6/1983 | U.S.S.R. | 47/62 |
| 2234415 | 2/1991 | United Kingdom | 47/62 |

Primary Examiner—Michael J. Carone
Assistant Examiner—Joanne C. Downs
Attorney, Agent, or Firm—Ice Miller Donadio & Ryan; Paul B. Overhauser

[57] ABSTRACT

A greenhouse and a method for controlling the environment of the interior space of the greenhouse is disclosed. The greenhouse (10) includes an interior insulative panel (22,23) and an exterior reflective panel (26) capable of insulating the interior of the greenhouse and reflecting sunlight into the interior. The greenhouse also includes a closed-system heat exchanger (30,31) having a plurality of spaced water-impermeable water flow passageways (60) through which water flows by gravitational forces and having a means for blowing air (65) between the water flow passageways (60) such that the air does not contact the water and such that the air is either heated or cooled by the water. In addition, the heat exchanger (30,31) may include a water discharge (71) and/or a gas discharge for the control of humidity and gas levels within the greenhouse. Finally, the greenhouse includes hydroponic plant beds (34,35) disposed on top of the heat exchangers (30,31) and hydroponic solution tanks (36,37) along the outer interior walls of the greenhouse. The floor plan of the greenhouse allows easy access to all plants and assists in maintaining the temperature within the greenhouse due to the presence of the hydroponic solution tanks without significantly reducing the area available for plants. Such a greenhouse is inexpensive to operate and maintain and may be used to extend the growing season of seasonal plants throughout the calendar year.

6 Claims, 5 Drawing Sheets

ENVIRONMENTALLY CONTROLLED GREENHOUSE

FIELD OF THE INVENTION

This invention relates to environmentally controlled greenhouses, and, in particular, to a greenhouse which extends the growing season of seasonal plants to last virtually throughout the calendar year.

BACKGROUND OF THE INVENTION

Greenhouses generally provide an environment which assists in facilitating the growth of many types of vegetation. In addition to the provision of optimum sunlight, the greenhouse's interior atmosphere may be controlled by other means. A heating or cooling system may be installed to compensate for variations from the desired interior temperature created by too little or too much sunlight. Reflective panels and insulating panels have also been pivotally attached to greenhouse wails and ceilings to assist in controlling the interior temperature. Despite the implementation of these technologies, the use of a greenhouse to extend the growing season of seasonal plants, such as strawberry plants, at an affordable cost, has been illusive. Generally, the requirement for a heating and cooling system sufficient to create a suitable environment for these environmentally sensitive plants has resulted in prohibitively expensive operating costs. Thus, it is desirable to develop an environmentally controlled greenhouse which may be utilized to extend the growing season of such plants and which is energy efficient and inexpensive to operate so that the farmer may profit from the sale of the plants or the fruit they bear.

One mechanism used to retain heat in the interior of the greenhouse during the nighttime hours or low sunlight conditions and to alleviate the problem of excess heating during warm weather comprises the placement of a translucent ceiling within the interior of the greenhouse. A movable panel is placed on top of the translucent ceiling during conditions of nighttime or low sunlight conditions. The panel is then moved away from the ceiling to allow sunlight to infiltrate through the translucent ceiling when sunlight or warmth in the greenhouse is desired. The translucent ceiling reduces the volume of space the greenhouse heating and cooling system must control, thereby reducing cost. Examples of translucent ceilings with movable panels include the inventions disclosed in U.S. Pat. Nos. 4,242,833 and 4,249,340. U.S. Pat. No. 4,552,212 discloses a solar heating and cooling system for a building which includes adjustable ceiling doors or panels which may be placed over the building's translucent ceiling to retain heat therein. U.S. Pat. No. 4,706,420 discloses pivotable insulative panels over the vertical exterior walls of the greenhouse and a retractable canopy which covers the roof of the greenhouse to thereby retain heat within the greenhouse.

To assist in directing sunlight into the interior of the greenhouse a variety of mechanisms have been used. For example, the greenhouse disclosed in U.S. Pat. No. 4,414,784 may be attached to a balcony of an apartment. Since all balconies may not be oriented to properly take advantage of the optimum sunlight conditions for plant growth, a reflector panel is provided which aids in directing sunlight into the enclosure of the greenhouse. Similarly, the greenhouse disclosed in U.S. Pat. No. 5,056,259 includes a roof whose incline may be adjusted and a screen which may be used to control the amount of sunlight directed toward the interior of the greenhouse. U.S. Pat. No. 4,929,444 discloses a solar building with a roof that may be adjusted to optimize the solar collection panel on the roof.

It is desirable to provide a greenhouse which is able to optimize the amount of sunlight required for the growth of the plants therein as well to retain the heat within the greenhouse according to prescribed optimum conditions for the types of plants within the greenhouse. Such a greenhouse may require a supplemental heating and/or cooling system, depending on the climate and the weather at a particular installation.

As previously mentioned, it is known to place conventional heating and/or cooling systems within the interior of a greenhouse to assist in maintaining the desired temperature therein. Such systems usually consume considerable energy under extreme exterior conditions, such as low sunlight coupled with low exterior temperature or intense sunlight coupled with high exterior temperature, so as to make their use in seasonal climate prohibitively expensive when trying to extend the growing season of seasonal plants. Electric and gas heaters or air conditioners utilize the energy source to affect a change in the interior temperature. Heat pumps are comprised of a compressor which is expensive to operate, and are sometimes ineffectual without the provision of an additional source of heat, under extreme conditions. Thus, it is desirable to provide a means for heating and cooling the interior of a greenhouse which is not prohibitively expensive to operate, is inexpensive to maintain, and which requires little maintenance or repair.

It is also desirable to provide an auxiliary heating and/or cooling system which is a closed system. That is, under ideal circumstances, the heating and cooling system should be able to operate within the interior of the greenhouse and not require that significant amounts of external air be brought into the interior of the greenhouse. Such external air is generally not optimum for the plant growth. For example, the external air may not be of the desired temperature, humidity or gas content as that of the interior of the greenhouse. Therefore, energy must be expended to "process" the external air to match that of the greenhouse's interior air.

Of importance in the use of a greenhouse is the actual floor plan of its interior space. Not only is it desirable to produce as much vegetation as possible, but it is also desirable to provide a greenhouse whose contents are arranged to permit easy access to the plants within the interior as well as to allow an individual to easily move about within the interior.

Hydroponics has gained popularity for use in growing plants within a greenhouse. In many instances, plant yields using hydroponics are equivalent to those for plants grown in fertile soil. However, the placement of the large hydroponic tanks containing the solution for providing nutrients to the plants is a problem. To avoid detracting from the space available for hydroponic plant growth and to avoid inhibiting the movement of workers within the greenhouse, the tanks are often located outside the greenhouse. Thus, the solution in the tanks may need to be heated or cooled before feeding the plants. Such heating and cooling consumes energy which results in increased costs. Therefore, it is desirable to provide a greenhouse in which the hydroponic solution tanks are positioned within the interior of the greenhouse such that the solution does not need to be heated or cooled before feeding the plants and such that the tanks do not significantly reduce the number of plants that may be grown within the greenhouse's interior space.

OBJECTS OF THE INVENTION

One object of the invention is to provide a greenhouse which is able to optimize the amount of sunlight required for the growth of the plants therein as well to retain the heat within the greenhouse according to prescribed optimum conditions for the types of plants within the greenhouse.

Another object of the invention is to provide an auxiliary means for heating and cooling the interior of a greenhouse which is not prohibitively expensive to operate, is inexpensive to maintain, and which requires little maintenance or repair.

Another object of the invention is to provide an auxiliary heating and/or cooling system which is a closed system.

Still another object of the present invention is to provide a greenhouse whose contents are arranged to permit easy access to the plants within the interior as well as to allow an individual to easily move about within the interior.

Yet another object of the present invention is to provide a greenhouse in which the hydroponic solution tanks are positioned within the interior of the greenhouse such that the solution does not need to be heated or cooled before feeding the plants and such that the tanks do not significantly reduce the number of plants that may be grown within the greenhouse's interior space.

SUMMARY OF THE INVENTION

A greenhouse and a method for controlling the environment of the interior space of the greenhouse is disclosed. The greenhouse includes an interior insulative panel and an exterior reflective panel capable of insulating the interior of the greenhouse and reflecting sunlight into the interior. The greenhouse also includes a closed-system heat exchanger having a plurality of spaced water-impermeable water flow passageways through which water flows by gravitational forces and having a means for blowing air between the water flow passageways such that the air does not contact the water and such that the air is either heated or cooled by the water. In addition, the heat exchanger may include a water discharge and/or a gas discharge for the control of humidity and gas levels within the greenhouse. Finally, the greenhouse includes hydroponic plant beds disposed on top of the heat exchangers and hydroponic solution tanks along the outer interior walls of the greenhouse. The floor plan of the greenhouse allows easy access to all plants and assists in maintaining the temperature within the greenhouse due to the presence of the hydroponic solution tanks without significantly reducing the area available for plants. Such a greenhouse is inexpensive to operate and maintain and may be used to extend the growing season of seasonal plants throughout the calendar year.

DETAILED DESCRIPTION

Figure 1:
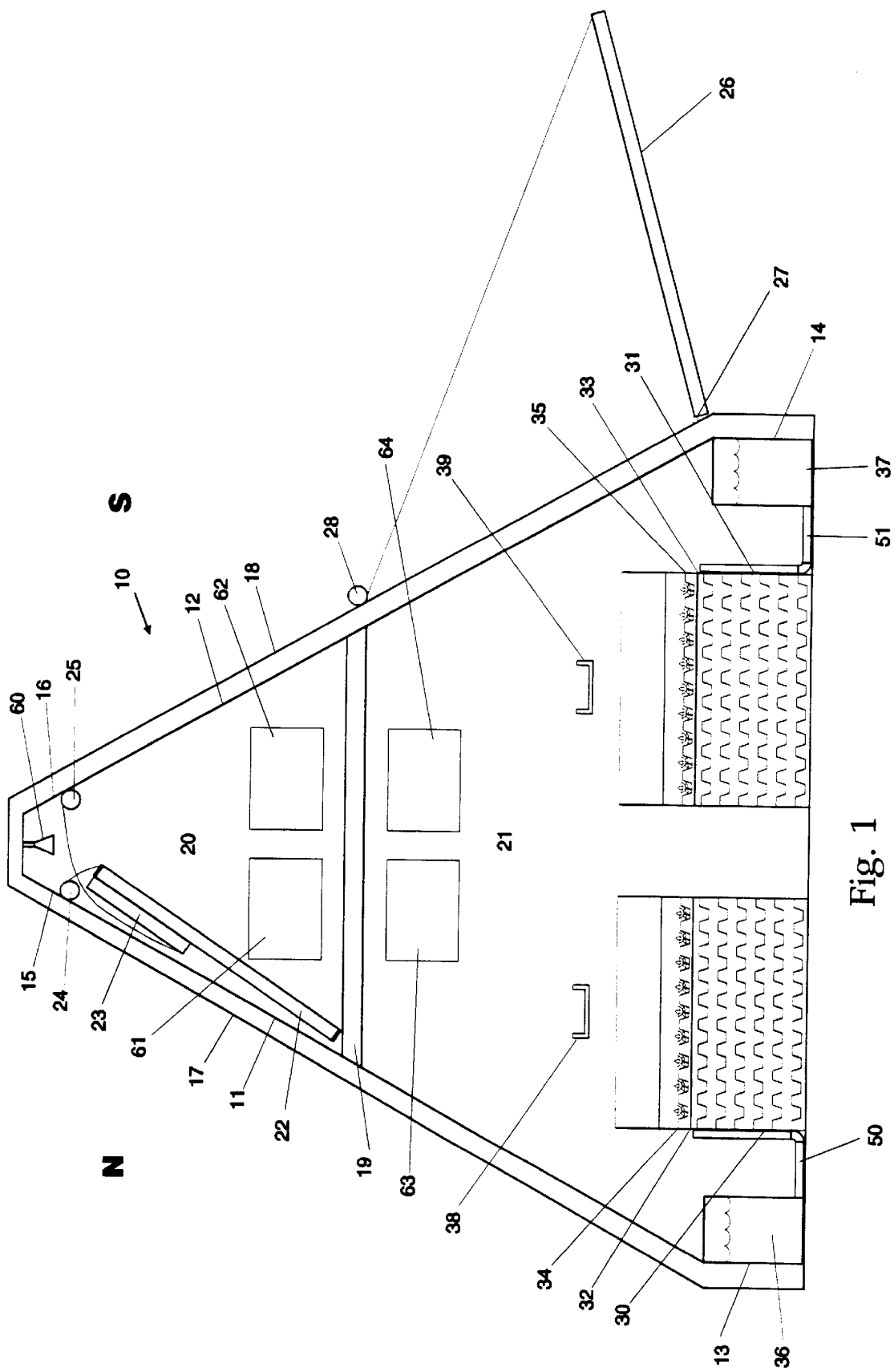
FIG. 1 shows a partial cross-sectional view of one embodiment of the west end of the greenhouse of the present invention in which the panels within the upper interior portion of the greenhouse are in the light transmissive position and the pivotable exterior panel is in its open, or reflective, position.

Referring to FIG. 1, there is shown a partial cross-sectional view of one embodiment of the west end of the greenhouse of the present invention in which the panels within the upper interior portion of the greenhouse are in the light transmissive position and the pivotable exterior panel is in its open, or reflective, position. The interior space of greenhouse 10 is defined by first and second opposing interior walls 11, 12, respectively. First and second interior walls 11, 12 are positioned with respect to each other such that first and second bases 13, 14 are separated by a greater distance than are first and second tops 15, 16. Translucent ceiling 19 divides the interior of greenhouse 10 into upper portion 20 and lower portion 21. Within upper portion 20 of greenhouse 10 are first and second insulative panels 22 and 23 suspended from the interior walls 11, 12 by first and second adjusting means 24 and 25, respectively, which may comprise, for example, a pulley attached to first or second interior walls 11, 12 and a rope connected to first or second insulative panels 22 or 23. First and second insulative panels 22, 23 are shown in FIG. 1 in the light transmissive position in which first and second insulative panels 22, 23 are spaced from translucent ceiling 19 to allow sunlight to enter lower portion 21 from upper portion 20 through translucent ceiling 19.

Greenhouse 10 comprises north and south exterior edges, 17, 18, respectively, as well as east and west exterior edges (not shown). Greenhouse 10 also includes pivotable panel 26 positioned along south exterior edge 18 of greenhouse 10. Pivotable panel 26 is connected to south exterior edge 18 by hinge 27 and third adjusting means 28. In FIG. 1, pivotable panel 26 is shown in its open, or reflective, positions in which pivotable panel 26 is angled with respect to south exterior edge 18 of greenhouse 10.

Also located within greenhouse 10 near tops 15, 16 of first and second interior walls 11, 12 is light 60. Light 60 may be used to assist in providing the optimal light conditions within the interior space of greenhouse 10 required for plant growth therein. Light 60 may be particularly useful in low natural sunlight conditions and may also be used to illuminate the interior of greenhouse 10 during nighttime hours. Along the west end of greenhouse 10, as shown, are windows 61–64. First and second windows 61, 62 are positioned above translucent ceiling 19 to provide access to upper interior portion 20. Third and fourth windows 63, 64 are positioned below translucent ceiling 19 to provide access to lower interior portion 21.

Figure 2:
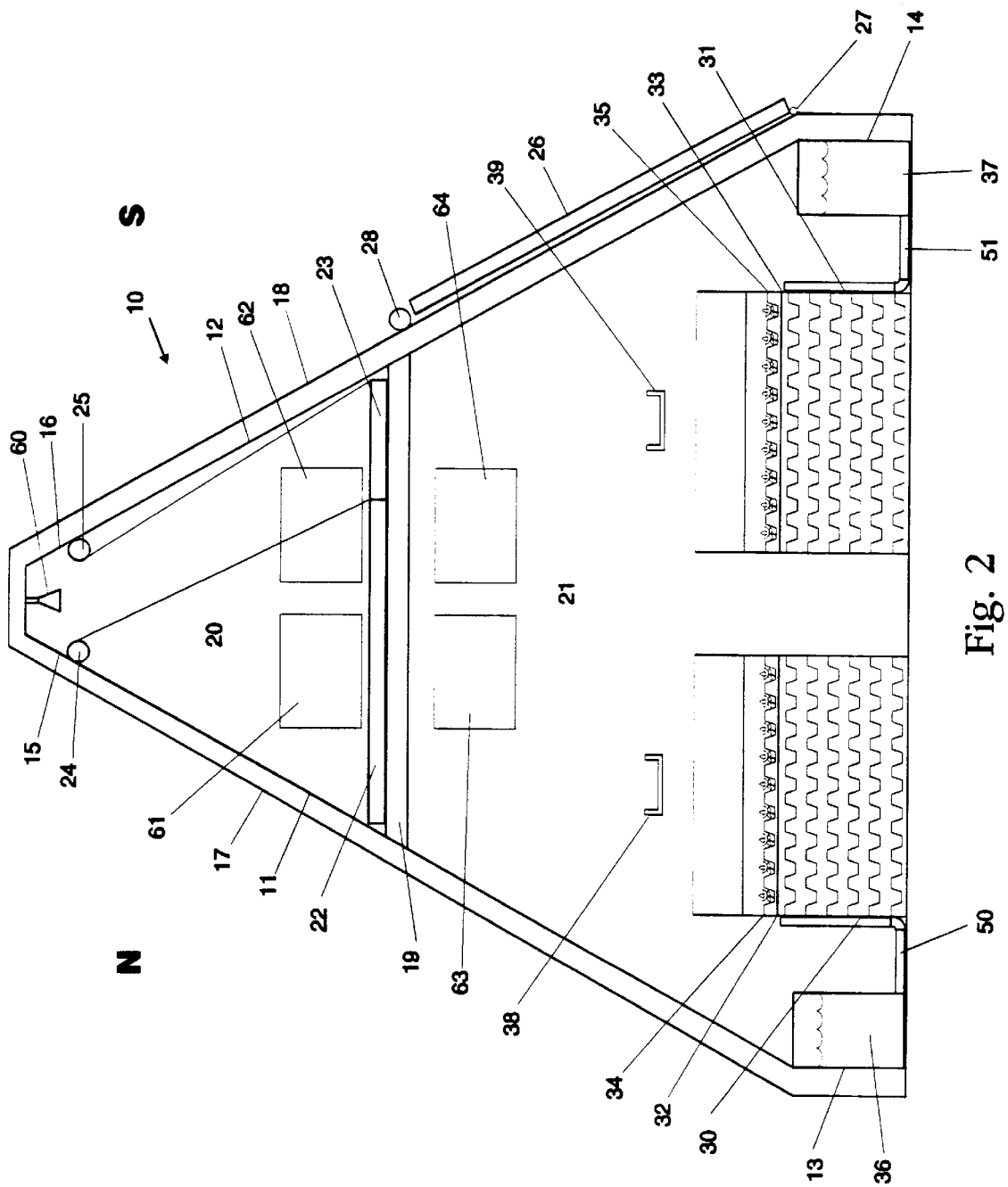
FIG. 2 shows a partial cross-sectional view of the embodiment of FIG. 1 in which the panel within the upper interior portion of the greenhouse is in its insulative position and the pivotable exterior panel is in its closed, or insulative, position.

FIG. 2 shows a partial cross-sectional view of the embodiment of FIG. 1 in which the panel within the upper interior portion of the greenhouse is in its insulative position and the pivotable exterior panel is in its closed, or insulative, position. In this configuration of greenhouse 10, first and second insulative panels 22, 23 have been adjusted by first and second adjusting means 24, 25 to be placed in a position in which first and second insulative panels 22, 23 substantially cover translucent ceiling 19. When in the insulative position, first and second insulative panels 22, 23 assist in maintaining the temperature within lower interior portion 21 as well as to limit the amount of sunlight entering lower portion 21.

In FIG. 2, pivotable panel 26 is in its closed, or insulative position, in which pivotally panel 26 is substantially flush against south exterior wall 18 of greenhouse 10. In its closed position, pivotable panel 26 assists in maintaining the temperature within lower portion 21 of greenhouse 10 as well as to limit the amount of sunlight entering lower portion 21.

It will be appreciated by those of skill in the art that the positioning of first and second insulative panels 22, 23 and pivotable panel 26 may be adjusted to various positions between those described above by using first, second and third adjustments means 24, 25 and 28, respectively. Thus, adjustments may be made for a multitude of sunlight conditions and exterior temperature conditions, thereby limiting the need for auxiliary heating or cooling in many instances. Generally, auxiliary heating and cooling is only required under extreme conditions, such as extremely cold exterior temperatures coupled with limited sunlight or extremely hot exterior conditions coupled with intense sunlight.

Returning to FIG. 1, first and second heat exchangers 30, 31 each having upper surface 32, 33, respectively, are positioned within lower interior portion 21 of greenhouse 10. First and second heat exchanger 30, 31, described in greater detail herein, are capable of heating and cooling lower interior portion 21 of greenhouse 10. Positioned above first and second upper surfaces 32, 33 are first and second hydroponic plant growing means 34, 35, respectively. First and second upper surfaces 32, 33 also serve as first and second hydroponic growing tables for the support of hydroponic growing means 34, 35 thereon. First and second hydroponic plant growing means 34, 35 are operatively connected to and provided with hydroponic solution from first and second hydroponic solution tanks 36 and 37, respectively, which are positioned such that they abut first and second opposing interior walls 11, 12. Positioned above first and second hydroponic plant growing means 34, 35 are first and second conveyor means 38, 39, respectively. First and second conveyor means 38, 39 may be used to transport plants or fruit removed from plants from first and second hydroponic growing means 34, 35 to another location within greenhouse 10.

It will be appreciated by those of skill in the art that the position of first and second hydroponic tanks 36, 37 within greenhouse 10 assists in maintaining the desired temperature within lower interior portion 21 of greenhouse 10 as they serve as a large thermal mass. In addition, the solution within first and second hydroponic tanks 36, 37 is of a temperature conducive to plant growth and does not require that a means be provided to heat or cool the solution as may be required should the tanks be located outside greenhouse 10.

Figure 3:
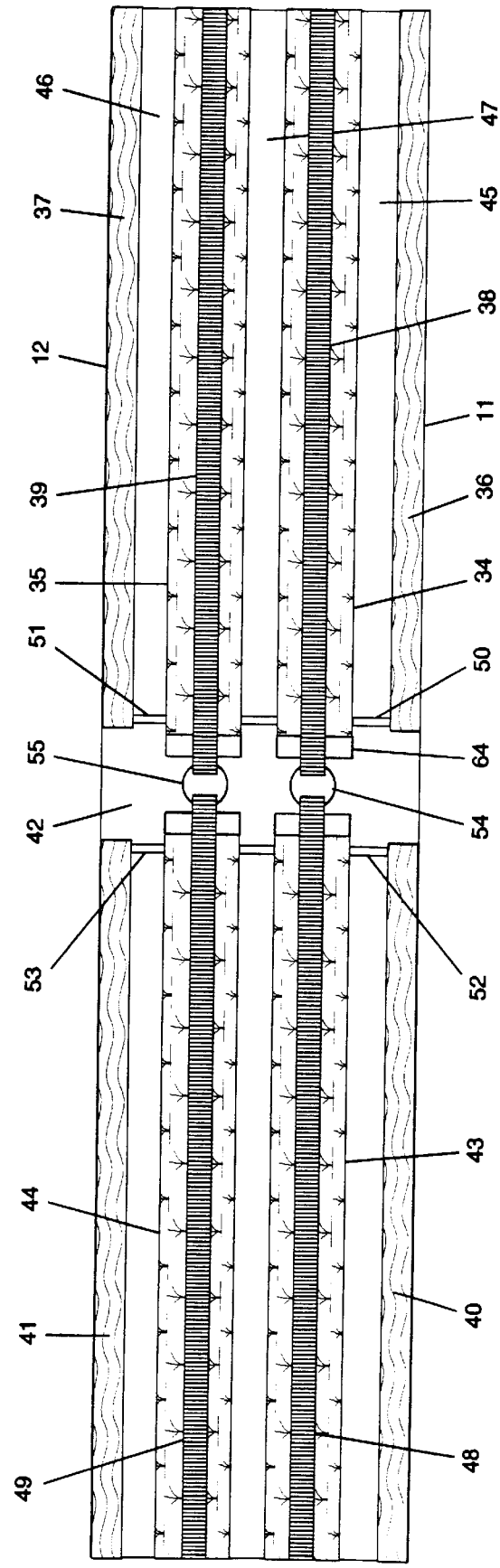
FIG. 3 shows a top view of one embodiment of the interior of the greenhouse of the present invention.

Referring to FIG. 3, there is shown a top view of one embodiment of the interior of the greenhouse of the present invention. Positioned along and abutting first opposing interior wall 11 are first and third hydroponic solution tanks 36, 40. Similarly, positioned along and abutting second interior wall 12 are second and fourth hydroponic solution tanks 37, 41. Cross isle 42, disposed between first and third hydroponic solution tanks 36, 40 and between second and fourth hydroponic solutions tanks 37, 41, allows a person within greenhouse 10 to traverse the center of greenhouse 10 between first and second interior walls 11, 12. Also located within greenhouse 10 are first, second, third and fourth hydroponic growing tables 34, 35, 43 and 44, respectively, which are operatively connected to first, second, third and fourth solution tanks 36, 37, 40, 41 via first, second, third and fourth connection means 50–53, respectively. In this embodiment, first, second third and fourth growing tables 34, 35, 43 and 44 comprise the upper surface of a temperature control means, or heat exchanger, as illustrated in FIG. 1. First and second hydroponic growing tables 34, 35 are disposed between first and second hydroponic solution tanks 36, 37 to permit easy access to all plants within greenhouse 10. Specifically, first growing table 34 is spaced from first solution tank 36 to form first longitudinal isle 45 which permits a person to be positioned therebetween. Second growing table 35 is space from second solution tank 37 to form second longitudinal isle 46 which permits a person to be positioned therebetween. Also, first growing table 34 is spaced from second growing table 35 to form third longitudinal isle 47 which permits a person to be positioned therebetween. In this embodiment, a similar arrangement exists for third and fourth hydroponic solution tanks 40, 41 and third and fourth hydroponic growing tables 43, 44 such that third solution tank 40 is spaced from third growing table 43 to form first longitudinal isle 45, fourth solution tank 41 is spaced from fourth growing table 44 to form second longitudinal isle 46, and third and fourth growing tables 43, 44 are spaced from each other to form third longitudinal isle 47. Also, growing tables 34, 35, 43, 44 are spaced such that cross isle 42 is formed between first and third growing tables 34, 43 and between second and fourth growing tables 35, 44.

It will be appreciated by those of skill in the art that the floor plan of the greenhouse in the embodiment of FIG. 3 is such that a person is able to access all plants within greenhouse 10 residing on growing tables 34, 35, 43, 44. In addition, the presence of hydroponic solution tanks 36, 37, 40, 41 does not impede a person from moving within greenhouse 10 nor do they significantly reduce the amount of area available for growing plants.

As shown in FIGS. 2 and 3, first, second, third and fourth conveyor means 38, 39, 48, and 49, respectively, are positioned above first, second, third and fourth growing tables 34, 35, 43 and 44, respectively. Fruits or plants from first and third growing tables 34, 43 may be transported via first and third conveyor means 38, 48 to first collection means 54 and fruits or plants from second and fourth growing tables 35, 44 may be transported via second and fourth conveyor means 39, 49 to second collection means 55.

It will be appreciated by those of skill in the art that first, second, third and fourth conveyor means 38, 39, 48, 49 provide a means by which fruits from plants may be quickly collected at a central location.

In one embodiment of the greenhouse of the present invention, the height of first and second hydroponic solution tanks 36, 37 is two (2) feet and the angle of exterior walls 17, 18 is 60° such that exterior walls 17, 18 reach a height of 16 feet above ground level. Thus, the width of greenhouse 10 is 17 feet. The height of first and second heat exchangers 30, 31 is two (2) feet and first and second conveyor means are positioned approximately three (3) feet above first and second heat exchangers 30, 31. Translucent ceiling 19 is eight (8) feet above ground level. The total length of greenhouse 10, as shown in FIG. 3, is 150 feet with heat exchangers 30, 31, the heat exchangers (not shown) below hydroponic growing tables 43, 44 and hydroponic solution tanks 36, 37, 40, 41 each being 72 feet in length. Thus the base dimensions of greenhouse 10 are 17 feet by 150 feet.

It will be appreciated by those of skill in the art that the dimensions of the greenhouse may be revised according to the number and type of plants to be grown within the greenhouse. Of course, the volume of the greenhouse of the present invention must be appropriate to allow sufficient heating and/or cooling as well as to provide appropriate levels of sunlight depending on the climate in which the greenhouse is installed.

Figure 4:
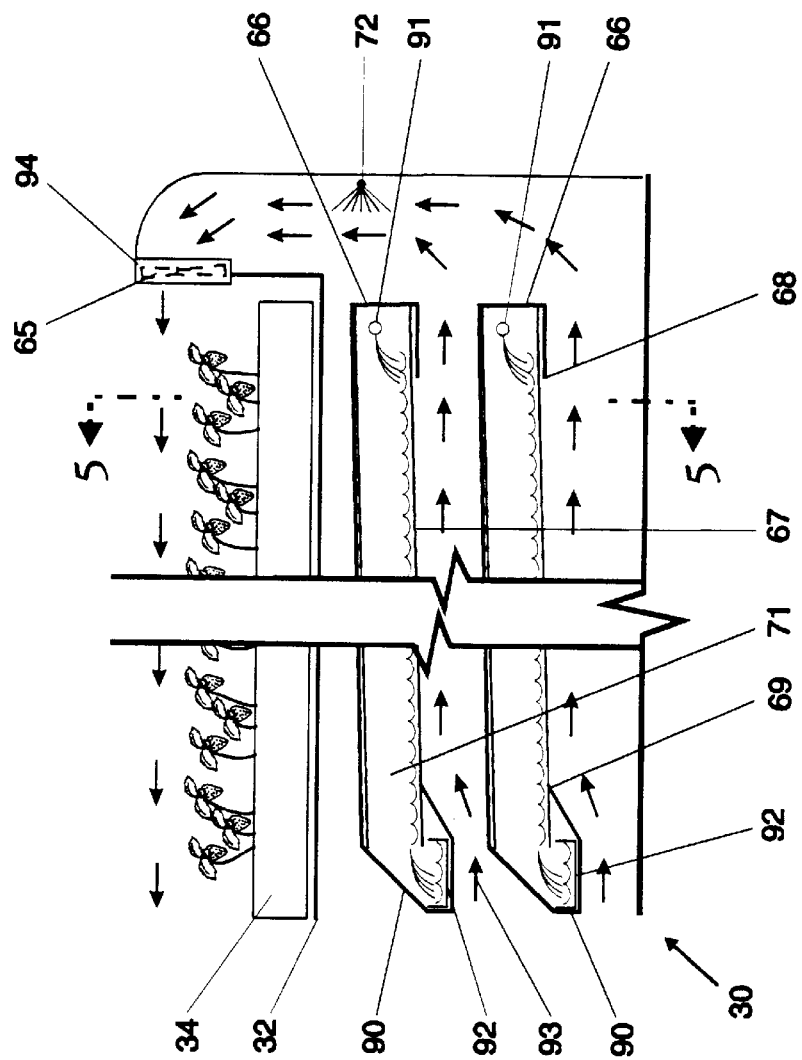
FIG. 4 shows a side view of one embodiment of the heat exchanger of the present invention.

FIG. 4 shows a side view of one embodiment of the heat exchanger of the present invention. Heat exchanger 30 has upper surface 32 above which is positioned hydroponic plant growing means 34. Within heat exchanger 30 is a plurality of spaced water-impermeable water flow means 90. Each water flow means 90 includes water inlet end 91 adapted to receive water from an external water source (see FIG. 5) as well as water outlet end 92 adapted to discharge water. Also, each water flow means 90 is disposed such that gravity causes water introduced through water inlet end 91 to flow to water outlet end 92. In one embodiment, water inlet end 91 may comprise, for example, an aperture in tubing into which water is introduced (see FIG. 5) and water outlet end 92 may comprise, for example, a trough into which water from water flow means 90 is collected. Such troughs may be connected to a common drain.

Heat exchanger 30 also includes air inlet 93 and air outlet 94, positioned such that air flowing from air inlet 93 to air outlet 94 moved between spaced water flow means 90. To blow air from air inlet 93 toward air outlet 94, heat exchanger 30 also includes fan 65.

Each water flow means 90 includes interior passageway 71 through which water flows and which does not contact the air flowing from air inlet 93 to air outlet 94. In this embodiment, each water flow means 90 includes polyurethane plastic sheet 66 wrapped around corrugated sheet 67, water inlet end 91 and water outlet end 92 and affixed to corrugated sheet 67 at first and second connection points 68 and 69. Corrugated sheet 67 is formed to provide passageway 71 (see FIG. 5).

It will be appreciated by those of skill in the art that little external energy is required to operate the heat exchanger of the present invention. In some manner, water must be provided to heat exchanger 30 and therefore may require energy to pump the water from the water supply (see FIG. 5). The only other energy consuming component of heat exchanger 30 is fan 65. Therefore, heat exchanger 30 is inexpensive to operate. In addition, the number and type of components which comprise heat exchanger 30 are such that heat exchanger 30 is inexpensive to maintain and requires little maintenance or repair.

It will also be appreciated that the heat exchanger of the present invention is a closed system. Heat exchanger 30 operates without requiring that air from the exterior of the greenhouse be used to maintain a constant temperature in the greenhouse. Thus, greater control, at less expense, over the interior space of greenhouse 10 is achieved than with auxiliary heating and cooling systems which require external air to be brought into greenhouse 10.

In addition to serving as a temperature control means, heat exchanger 30 may be used to control humidity and the level of various gases within greenhouse 10. Referring to FIG. 4, water discharge means 72, shown in this embodiment to be positioned near air outlet 94, is adapted to discharge water into air flowing toward air outlet 94 to thereby humidify air entering the interior space of greenhouse 10. A similar gas discharge means (not shown) may be included in heat exchanger 30 to introduce carbon dioxide, or other desired gases, into air flowing toward air outlet 94 to thereby control the level of gases within the interior space of greenhouse 10.

Figure 5:
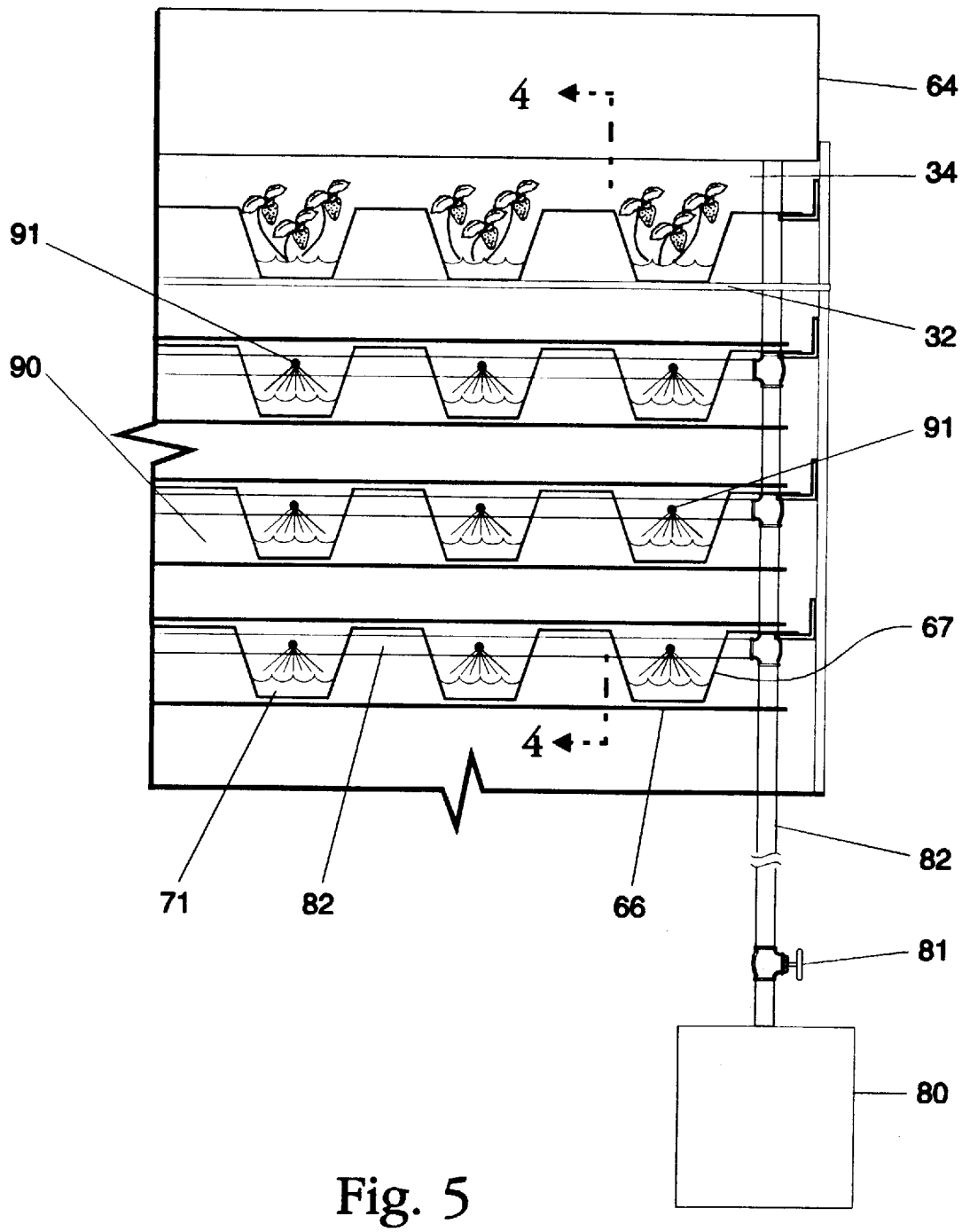
FIG. 5 shows an end view of the heat exchanger of the embodiment of FIG. 4.

Referring to FIG. 5, there is shown an end view of the heat exchanger of the embodiment of FIG. 4. In this embodiment, water is supplied to heat exchanger 30 from water source 80. Water is moved from water source 80 through water transfer means 82 into interior passageways 71 of water flow means 90 through water inlet end 91. Water flow means 90 may comprise, for example, copper tubing and water inlet end 91 may be an aperture within the tubing. Valve 81 provides a means for variably controlling the amount of water introduced into water inlet end 91 to thereby affect the degree to which temperature of air flowing within heat exchanger is changed by the temperature of water flowing within water flow means 90.

It will be appreciated by those of skill in the art that water source 80 may comprise water from a natural source. Such water is often approximately 55° F. in temperature. Thus, if the interior space of greenhouse 10 is less than 55° F., the air flowing within heat exchanger 30 will be warmed toward 55° F., or, if the interior space of greenhouse 10 is greater than 55° F., the air flowing within heat exchanger 30 will be cooled toward 55° F.

To control the environment within the greenhouse of the present invention, a water source is provided to water inlet end 91 and drained into water outlet end 92. Air is forced between spaced flow means 90 such that the temperature of the air at air outlet 94 is closer to the temperature of water than it is at air inlet 93.

It will be appreciated by those of skill in the art that the operation of heat exchanger 30, first and second insulative panels 22, 23 and pivotable exterior panel 26 results in an environment in which the temperature, humidity and gas levels of the interior space of greenhouse 10 may be precisely controlled to allow greenhouse 10 to be used to grow plants, such as strawberries, which are ordinarily very seasonal as they require a particular set of environmental conditions for growth of the plant and any fruit which the plant may bear.

I claim:

1. A method for controlling the environment within a greenhouse, comprising the steps of:
    (a) providing a greenhouse having walls defining an interior space and exterior edges, a heat exchanger and a hydroponic plant growing means, the heat exchanger having an upper surface, the hydroponic plant growing means positioned above the upper surface of the heat exchanger, and the heat exchanger comprising:
        (i) a plurality of spaced water-impermeable flow means having first and second opposing ends defining a length of the flow means, a width of the flow means being less than the length of the flow means, each flow means comprising
            a water inlet end adaptive to receive water, and
            a water outlet means adaptive to discharge water, and
            each flow means being disposed such that gravity may cause water to flow from the inlet end toward the outlet means;
        (ii) an air inlet and an air outlet, positioned such that air flowing from the air inlet to the air outlet moves between each of said flow means, wherein each of said flow means further comprises an interior passageway in which water flows, and wherein air flowing from the air inlet to the air outlet between the flow means does not contact water in said interior passageway, and
        (iii) a fan adapted to move air from the air inlet toward the air outlet, the fan positioned at one end of the flow means and oriented to move air toward an opposite end of the flow means;
    (b) providing a water source to the water inlet end;
    (c) draining water into the water outlet means; and
    (d) forcing air between the flow means such that the temperature of the air at the air outlet is closer to the temperature of provided water than the air at the air inlet.

2. The method of claim 1 wherein the greenhouse further comprises a translucent ceiling within the interior space such that the translucent ceiling divides the interior space into upper and lower portions and at least one panel in the upper portion is movable between an insulative position in which the panel substantially covers the translucent ceiling and a light transmissive position in which the panel is spaced from the translucent ceiling, further comprising the step of:

(e) adjusting the panel between the insulative position and the light transmissive position.

3. The method of claim 1 wherein the greenhouse further comprises at least one panel pivotally positioned along one exterior of the greenhouse, the panel being movable between a closed position in which the panel is substantially flush against the greenhouse, and an open position in which the panel is at an acute angle with respect to the exterior d of the greenhouse, further comprising the step of:

(e) adjusting the exterior panel between its closed position and its open position.

4. The method of claim 1 wherein the heat exchanger further comprises at least one water discharge means adapted to discharge water into air flowing toward the air outlet to thereby humidify the interior space, further comprising the step of:

(e) discharging water into the air flowing toward the air outlet.

5. The method of claim 1 wherein the heat exchanger further comprises carbon dioxide introduction means for introducing carbon dioxide into air flowing toward the air outlet, and further comprising the step of:

(e) introducing carbon dioxide into the carbon dioxide introduction means.

6. The method of claim 1 wherein the greenhouse further comprises an air duct means positioned to receive air from the air outlet and direct air toward the hydroponic plant growing means.

* * * * *